United States Patent [19]

Pramaggiore

[11] 4,293,761

[45] Oct. 6, 1981

[54] CIGARETTE LIGHTERS, PARTICULARLY FOR MOTOR VEHICLES

[76] Inventor: Luigi Pramaggiore, Strada Statale 26, 11010 Sarre (Aosta), Italy

[21] Appl. No.: 100,261

[22] Filed: Dec. 4, 1979

[30] Foreign Application Priority Data

Dec. 19, 1978 [IT] Italy .................................. 6989 A/78

[51] Int. Cl.³ ............................................. F23Q 7/22
[52] U.S. Cl. .................................... 219/269; 219/220; 219/264; 219/267
[58] Field of Search ............... 219/220, 230, 248, 260, 219/263, 264, 265, 267, 269, 487, 505, 506; 250/218; 361/264, 266

[56] References Cited

U.S. PATENT DOCUMENTS

| | | | |
|---|---|---|---|
| 2,514,171 | 7/1950 | Walther et al. | 219/269 |
| 2,692,938 | 10/1954 | Cone | 219/269 X |
| 2,918,559 | 12/1959 | Pramaggiore | 219/269 |
| 3,134,885 | 5/1964 | Pramaggiore | 219/264 |
| 3,462,721 | 8/1969 | Boudreau | 219/265 X |
| 3,502,887 | 3/1970 | Erickson et al. | 250/218 |
| 3,692,976 | 9/1972 | Pramaggiore | 219/264 |
| 3,943,326 | 3/1978 | Henry | 219/505 X |
| 4,176,273 | 11/1979 | Fujie et al. | 219/220 |

*Primary Examiner*—Volodymyr Y. Mayewsky

[57] ABSTRACT

A cigarette lighter, particularly for mounting on the dashboard of a motor vehicle, having a control knob mounted for sliding movement within a cylindrical casing and acting through a spring upon a control rod extending up to and in engagement with a pivotally mounted contact plate for energizing and deenergizing a hot plate adapted to light a cigarette when it is placed with its end thereagainst. A bimetal tongue is secured adjacent the hot plate and grips one edge of said pivotally mounted contact plate in the operative position thereof to release it when the bimetal tongue gets hot and thereby deenergize the hot plate.

The cigarette is held in a removable insert in the control knob. When the insert is removed, the lighter can be used for lighting cigars. The cylindrical casing is surrounded by spring means for attachment of the lighter in a hole in the dashboard.

5 Claims, 5 Drawing Figures

CIGARETTE LIGHTERS, PARTICULARLY FOR MOTOR VEHICLES

This invention relates to improvements in cigarette lighters, particularly for motor vehicles.

It is known that such lighters have been devised for the convenience of the drivers of motor vehicles so that they have to remove their hands from the steering wheel as little as possible when they wish to light a cigarette and do not want to run risks while they are driving. To ensure this, the lighter is so placed in the vicinity of the driver that he can easily and rapidly reach it and also recognize it at night when it is dark within the vehicle.

It is an object of the present invention to provide an improved lighter which meets these requirements, is of simple and sturdy construction and can be manufactured at low cost.

Another object of the present invention is to provide a lighter of the type described above that can be mounted on an instrument panel or dashboard of a motor vehicle even if it does not have the usual seat for receiving a lighter. So the work involved in producing such a seat is saved and the same lighter can be used for all types of vehicles.

U.S. Pat. No. 3,692,976 of the same inventor discloses a cigarette lighter, particularly for motor vehicles, having a control knob mounted for sliding movement within a cylindrical casing and acting upon a pivotally mounted contact plate for opening and closing an electric circuit including an electrical heating resistance adapted to light a cigarette when it is held thereagainst, with a bimetal tongue positioned adjacent said hot plate so as to be heated thereby and having a shaped end projecting toward and in engagement with an edge of said pivotally mounted contact plate to release the latter when the cigarette is lighted and said bimetal tongue has been heated.

The present invention provides several improvements over the device disclosed in this U.S. Patent to achieve the aforementioned objects. More particularly, the invention provides a light emitting diode mounted in said cylindrical casing for emission of light to indicate the position of the lighter on an instrument panel of the motor vehicle, and means for detachably mounting the lighter on the instrument panel.

A preferred embodiment of the invention will now be described by way of example and with reference to the accompanying drawings, in which.

Figure 1:
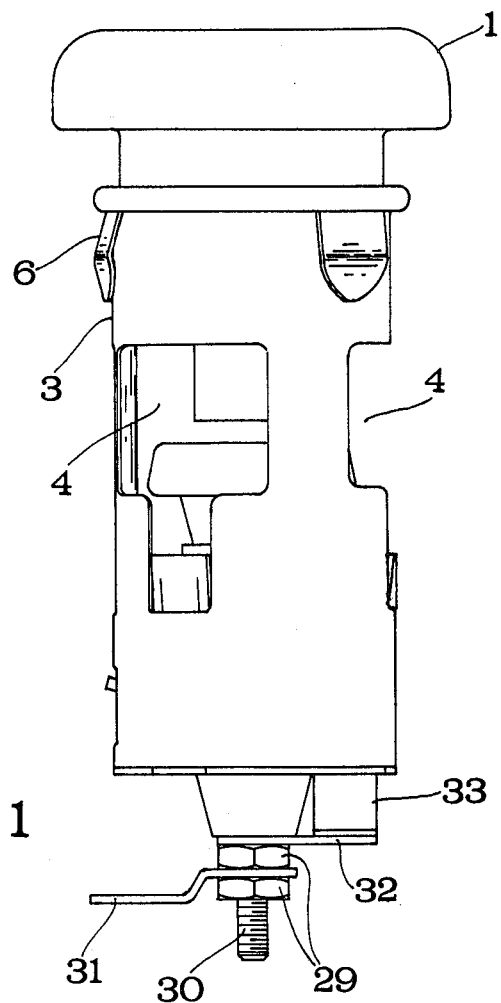
FIG. 1 is an external front view of a lighter according to the invention.
Figure 2:
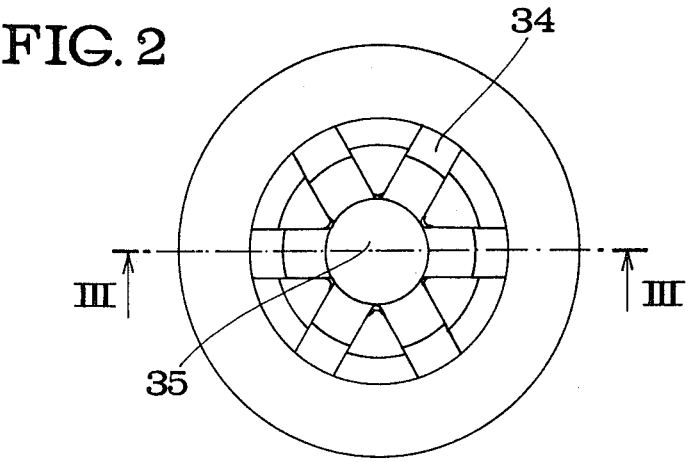
FIG. 2 is a top plan view of FIG. 1.
Figure 3:
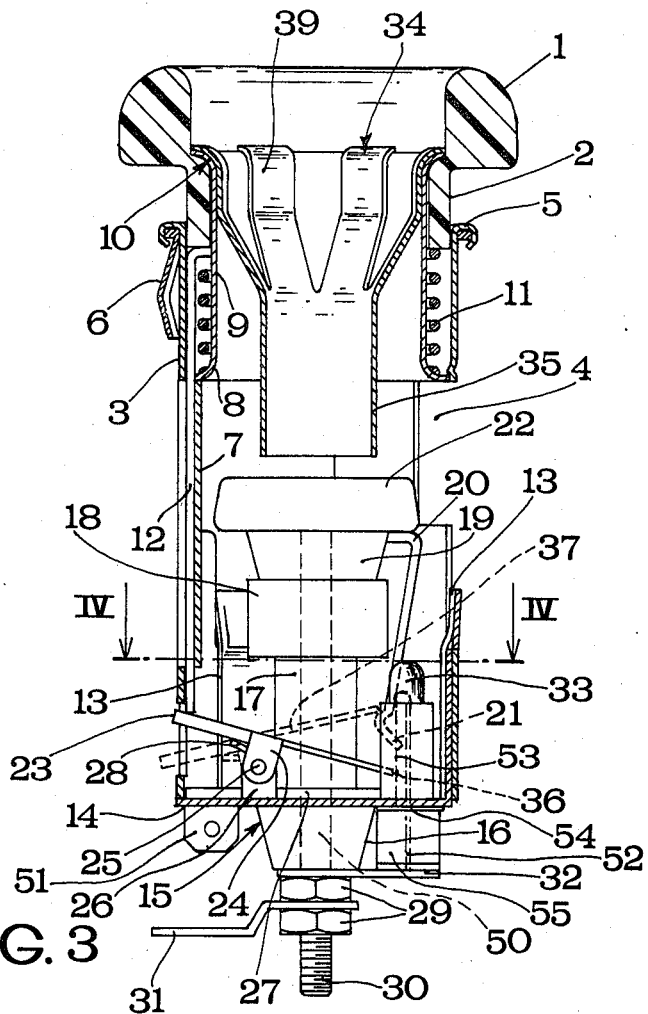
FIG. 3 is a section taken on the line III—III of FIG. 2.

Referring to the drawings, and more particularly to FIG. 3, denoted by 1 is a control knob of synthetic plastic material of considerable hardness for controlling the lighting of a cigarette inserted in a central opening therein, the control knob 1 having an axial through bore and a tubular portion 2 of reduced diameter slidably received in a cylindrical casing 3 provided with lightening apertures 4 and upwardly with a bent-round peripheral edge 5 for receiving a plurality of angularly equidistantly spaced resilient tabs 6 for securing the lighter in a hole in an instrument panel of a motor vehicle by elastically deforming the tabs as the lighter is pressed into the hole.

Mounted concentrically within the cylindrical casing 3 is a tubular metal reinforcement 9 having a foot portion 8 and an outwardly bent upper end portion 10 mating the inside wall of the tubular portion 2 of the control knob 1. A helical spring 11 is located in the gap formed between the cylindrical casing 3 and the tubular metal reinforcement 9 and engages with one end the foot portion 8 of the tubular metal reinforcement 9 and with the other the lower end of the tubular portion 2 of the control knob 1 to normally urge the latter outwardly.

The upper end of the helical spring 11 is bent straight and extends downwardly to serve as a control rod 12 for a pivotally mounted contact plate 23 which will be described in greater detail hereinafter. The control rod 12 is slidably retained in a guide groove formed by bending inwardly a part 7 of the wall of the cylindrical casing 3 and extending longitudinally thereof.

A bottom disc 14 is mounted at the lower end within the cylindrical casing 3 by means of peripherally equidistantly spaced resilient tabs 13 for retaining a circular ceramic support member 15 having superimposed circular portions 16, 17 and 18 of different diameters. The uppermost circular portion 18 of the support member 15 carries a cup-shaped member 19 supporting a hot plate 22 containing an electrical heating resistance (not shown) for heating it to become red-hot and thus permit lighting of a cigarette placed with one end thereon and inserted through the control knob 1. Secured to the cup-shaped member 19 in engagement with the hot plate 22 is a bimetal tongue 20 having a resilient shaped end 21 projecting toward and in engagement with an edge of a pivotally mounted contact plate 23 to normally hold the latter, but releasing it when the bimetal tongue becomes heated and the cigarette has been lighted.

Figure 4:
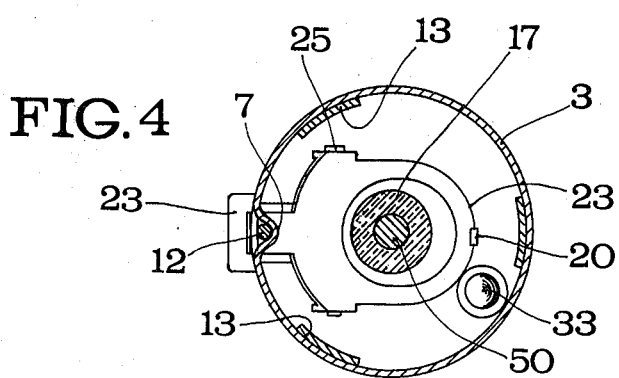
FIG. 4 is a section taken on the line IV—IV of FIG. 3.

The pivotally mounted contact plate 23 has an opening therein which surrounds the middle portion 17 of the support member 15 with sufficient clearance to permit pivotal movement of the contact plate 23 to a limited predetermined extent (cf. FIG. 4). The contact plate 23 has at its edges a pair of bent-off lugs 24 fitting corresponding lugs 26 projecting upwardly from a plate 27 secured to and coextensive with the bottom disc 14. By insertion of a rivet 25 in aligned holes in each of a pair of lugs 24 and 26, the contact plate 23 is pivotally connected to the bottom disc 14. A spring 28 is inserted between the plate 27 and the contact plate 23 to normally hold the latter in its deenergized inoperative position shown in full lines in FIG. 3.

The lower portion 16 of the ceramic support member 15 has a downwardly projecting threaded stem 30 to which an electric current input connection plate 31 is secured between a pair of screw nuts 29. A further plate 32 is secured between the lower portion 16 of the ceramic support member 15 and the adjacent screw nut 29 on the threaded stem 30 to support a light emitting diode 33 retained in a socket support 33a.

A metal insert 34 having a tubular end portion 35 and at the opposite end a plurality of equidistantly peripherally spaced and outwardly bent resilient blades 39 arranged in the manner of the petals of a flower can be elastically introduced into the tubular metal reinforcement 9 of the control knob 1 to hold a cigarette whose diameter corresponds to the inside diameter of the tubular end portion 35. When the insert 34 is placed in the metal reinforcement 9, the resilient blades 39 will urge against the inside wall of the metal reinforcement 9 and come to rest with their outwardly bent rounded ends nesting on the correspondingly shaped outer end of the metal reinforcement 9. When the metal insert 34 is removed, a cigar can be inserted and lit in the lighter, the cigar having a greater diameter, as is known, and therefore could not normally be lit in a lighter for cigarettes.

Current is supplied from the battery of the motor vehicle by means of a conductor (not shown) to the input connection plate 31. The input connection plate 31 is electrically connected to the stem 30 which has an upward extension 50 leading upwardly and electrically connected to the hot plate 22. After heating the hot plate 22 the current flows therefrom through the bimetal tongue 20, contact plate 23 in the closed position, lugs 24 and 26 and bottom disc 14 to a connection lug 51 extending downwardly therefrom and connected by means of a conductor (not shown) to the ground side of the battery.

Current is supplied to the diode 33 through the support plate 32 electrically connected to stem 30, a central stem 52 extending longitudinally through the body of the diode from plate 32 to the cathode of the diode, through the anode of the diode and a conductor 53 extending parallel to the stem 52 and connected downwardly to a single coil spring 54 having only one coil engaging the underside of bottom disc 14, the spring 54 being retained on a step formed at the top of an enlarged bottom portion 55 of the diode body and peripherally surrounding the diode body. By the upper screw nut 29 the diode 33 is held in position with the spring 54 in engagement with bottom disc 14. From the bottom disc 14 the current returning from the diode flows back through connection lug 51 to the ground side of the battery.

The operation of the lighter is as follows:

When the driver or an occupant of the vehicle wishes to light a cigarette, he depresses the control knob 1 against the action of the spring 11. Thereby the spring 11 is moved downwardly together with the control rod 12 secured thereto. When the control rod 12 engages the pivotally mounted contact plate 23, the latter will pivot from the full line position, shown in FIG. 3, to the position shown in dash lines against the action of the spring 28. In this latter position an end 36 of the contact plate 23, opposed to that engaged by the control rod 12, is firmly held by the shaped end 21 of the bimetal tongue 20.

In this operative position of the contact plate 23, the electric circuit fed by the battery of the motor vehicle is closed and electric current is supplied to the heating resistance in the hot plate 22 to heat the latter until it becomes red-hot for lighting the cigarette or cigar whose end is placed in contact therewith through the central hole in the control knob 1. As the tongue 20 is bimetallic, it operates as a timer, i.e. after a short period, for example 30 seconds, it swings away from the contact plate 23, releasing the latter and allowing it to swing under the action of the spring 28 to the full line position shown in FIG. 3. Thereby the cylindrical casing 3 and the control knob 1 are pushed upwardly and the electric circuit is deenergized.

The light emitting diode 33 serves to illuminate the inside of the lighter and thus spread a faint light to the outside to indicate the position of the lighter on the instrument panel and thus make the lighter visible to the driver or occupant of the vehicle in the dark. This is a further advantage of the lighter according to the invention in that the light emitting diode is safer than the conventional phosphorescent ring on the control knob which could be confused with the numerous other warning lights already existing on the instrument panel.

Figure 5:
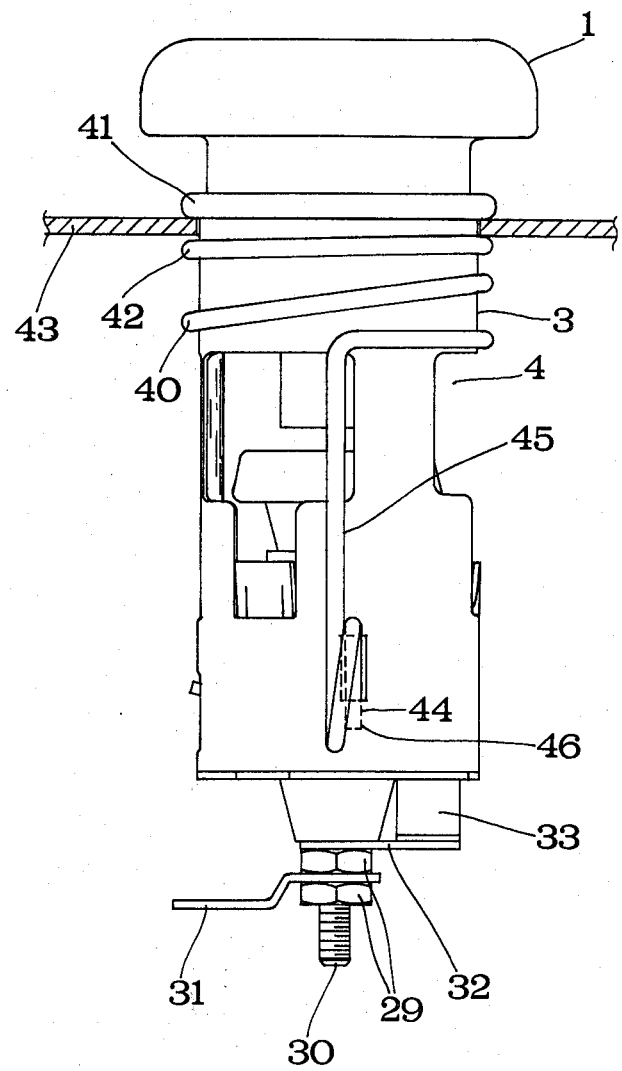
FIG. 5 is an external front view as in FIG. 1, but showing different means for mounting the lighter on the control panel.

FIG. 5 illustrates a further advantage of the present invention which consists in that the present lighter can be mounted on the instrument panel even if the latter has no particularly adapted hole for receiving the lighter. This is accomplished by a helical spring 40 which is concentrically mounted on the cylindrical casing 3 and the edge of the instrument panel 43 is inserted in the gap formed between the two upper turns 41 and 42 thereof. The opposite end of the spring 40 is formed with a straight portion 45 terminating with a shaped portion 44 inserted in an opening 46 in the cylindrical casing 3 to retain the lower portion of the lighter.

From the foregoing description it will be evident that the present lighter is of particularly simple construction and reliable operation and moreover is practically universally applicable. In fact, by means of the spring 40 the lighter can also be mounted on small cars, trucks and the like which usually do not have a special hole for fixing a lighter in the instrument panel.

Also the provision of the metal insert 34 which permits the lighter to be used either for lighting cigarettes or cigars affords a considerable advantage over conventional lighters, particularly for northern countries where truck drivers and motorists usually smoke cigars rather than cigarettes because they find the cigar more handy when they have their hands covered with gloves. This is why for example on a truck the driver can himself make a hole in the instrument panel and attach the present lighter thereto by means of the spring 40 without requiring any skilled assistance.

Although a preferred embodiment of the invention has thus been described in detail and illustrated in the accompanying drawings, it is to be understood that the invention is not limited to this precise embodiment and that numerous changes and modifications may be made therein without departing from the scope of the invention as defined by the appended claims.

I claim:

1. A cigarette lighter, particularly for motor vehicles, having a control knob mounted for sliding movement within a cylindrical casing and acting through a control rod upon a pivotally mounted contact plate for opening and closing an electric circuit including an electrical heating resistance incorporated in a hot plate adapted to light a cigarette when it is held against;

a bimetal tongue positioned adjacent said hot plate so as to be heated thereby and having a resilient shaped end projecting toward and in engagement with an edge of said pivotally mounted contact plate to release the latter when the cigarette is lighted and said bimetal tongue has been heated;

a light emitting diode mounted in said cylindrical casing for emission of light to indicate the position of the lighter on an instrument panel;

said electric circuit comprising an input connection plate connectable to a source of current secured to a lower end of an upright stem extending through a lower portion of said lighter and supporting at its upper end said hot plate, said electric circuit further comprising said bimetal tongue, said pivotally mounted contact plate, mounting lugs for said contact plate, a bottom disc supporting said mounting lugs and a connection lug extending downwardly from said bottom disc and connectable to a ground side of said source of current;

said electric circuit, for energization of said light emitting diode, further comprising a support plate secured to and extending perpendicularly from said upright stem, a central stem extending perpendicularly upwardly from a free end of said support plate and through a diode body of said light emitting diode to a cathode thereof, a conductor extending parallel to said central stem from an anode of said diode located opposite said cathode to a single coil spring peripherally surrounding said diode body in a position intermediate the ends thereof, said coil spring engaging the under side and being electrically connected to said bottom disc which through said connection lug extending downwardly therefrom is connected to the ground side of said source of current; and resilient means peripherally surrounding the end of said cylindrical casing adjacent said control knob for detachably mounting the lighter on the instrument panel.

2. A cigarette lighter as claimed in claim 1, wherein said resilient means comprises a plurality of resilient tabs peripherally equidistantly spaced around the outer periphery of said cylindrical casing.

3. A cigarette lighter as claimed in claim 1, wherein said resilient means comprises a helical spring surrounding the outer periphery of said cylindrical casing at the end thereof adjacent said control knob, said helical spring permitting the lighter to be mounted in the hole of the instrument panel of the motor vehicle by inserting the instrument panel between a pair of the initial turns of said helical spring.

4. A cigarette lighter as claimed in claim 3, wherein said helical spring has a straight portion opposed to the end for insertion into the instrument panel, said straight portion terminating with a portion shaped to be inserted in an opening in said cylindrical casing for retaining the lower portion of the lighter.

5. A cigarette lighter as claimed in claim 2, wherein said control knob has a central hole for receiving a cigarette to be lit and said central hole is provided with an insert having an inside diameter corresponding to the outside diameter of the cigarette and said insert is removable and after removal of the insert the diameter of said central hole corresponds to that of a normal cigar to hold and light a cigar in the same lighter, and said insert is retained in said central hole in said control knob by a plurality of peripherally equidistantly spaced resilient blades of said insert, said resilient blades urging against the inside of a front end of said central hole when said insert is in position therein, said insert having a tubular end portion at the end thereof opposed to said resilient blades, the inside diameter of said tubular end portion corresponding to the outside diameter of a cigarette.

* * * * *

UNITED STATES PATENT AND TRADEMARK OFFICE
CERTIFICATE OF CORRECTION

PATENT NO. : 4,293,761
DATED : October 6, 1981
INVENTOR(S) : Luigi PRAMAGGIORE

It is certified that error appears in the above-identified patent and that said Letters Patent are hereby corrected as shown below:

On the cover sheet [30] should read:

--- Foreign Application Priority Data

December 19, 1978 [IT] Italy.... 69891 A/78 ---

Signed and Sealed this

Eighth Day of December 1981

[SEAL]

Attest:

Attesting Officer

GERALD J. MOSSINGHOFF

*Commissioner of Patents and Trademarks*